(12) United States Patent
Matsushita et al.

(10) Patent No.: US 8,441,543 B2
(45) Date of Patent: May 14, 2013

(54) IMAGE PROCESSING APPARATUS, IMAGE PROCESSING METHOD, AND COMPUTER PROGRAM

(75) Inventors: Nobuyuki Matsushita, Kanagawa (JP); Jiro Takatori, Tokyo (JP); Yuki Kawaguchi, Tokyo (JP)

(73) Assignee: Sony Corporation (JP)

( * ) Notice: Subject to any disclaimer, the term of this patent is extended or adjusted under 35 U.S.C. 154(b) by 465 days.

(21) Appl. No.: 12/660,610

(22) Filed: Mar. 2, 2010

(65) Prior Publication Data

US 2010/0231740 A1  Sep. 16, 2010

(30) Foreign Application Priority Data

Mar. 11, 2009  (JP) ................ P2009-058251

(51) Int. Cl.
*H04N 5/235* (2006.01)
*H04N 9/68* (2006.01)
*G06K 9/00* (2006.01)

(52) U.S. Cl.
USPC ............. 348/222.1; 348/234; 382/162

(58) Field of Classification Search .......... 348/222.1, 348/234–238, 241
See application file for complete search history.

(56) References Cited

U.S. PATENT DOCUMENTS

| | | | | |
|---|---|---|---|---|
| 6,885,775 B2 * | 4/2005 | Kondo et al. | ............. | 382/268 |
| 7,576,891 B2 * | 8/2009 | Hwang | ............. | 358/1.9 |
| 8,023,764 B2 * | 9/2011 | Miyake et al. | ............. | 382/275 |
| 8,031,935 B2 * | 10/2011 | Shiraishi | ............. | 382/163 |
| 2004/0263887 A1 * | 12/2004 | Kotani | ............. | 358/1.9 |
| 2005/0238227 A1 * | 10/2005 | Takahashi | ............. | 382/162 |
| 2006/0291746 A1 * | 12/2006 | Kang et al. | ............. | 382/275 |
| 2007/0147697 A1 * | 6/2007 | Lee et al. | ............. | 382/260 |

FOREIGN PATENT DOCUMENTS

| | | |
|---|---|---|
| JP | 2001189944 A | 7/2001 |
| JP | 2002077928 A | 3/2002 |
| JP | 2003234950 A | 8/2003 |
| JP | 2004-151907 A | 5/2004 |
| JP | 2004172987 A | 6/2004 |
| JP | 2005268961 A | 9/2005 |
| JP | 2006166030 A | 6/2006 |
| JP | 2007043312 A | 2/2007 |
| JP | 2008059406 A | 3/2008 |
| JP | 2008187260 A | 8/2008 |
| JP | 2009027619 A | 2/2009 |

OTHER PUBLICATIONS

Office Action from Japanese Application No. 2009-058251, dated Jan. 18, 2011.
European Search Report EP 10155262, dated Jul. 23, 2010.
Office Action from Japanese Application No. 2009-058251, dated Jul. 3, 2012.

* cited by examiner

*Primary Examiner* — Trung Diep
(74) *Attorney, Agent, or Firm* — Lerner, David, Littenberg, Krumholz & Mentlik, LLP

(57) ABSTRACT

An image processing apparatus includes: a conversion unit converting a first color image signal including a predetermined color space into a second color image signal including a color space having a luminance signal and a color difference signal; a color determination section determining a color of each pixel of the first color image signal or the second color image signal; and a noise removal unit performing a noise removal process by changing a noise removal strength with respect to the color difference signal in accordance with the color determined by the color determination section.

10 Claims, 9 Drawing Sheets

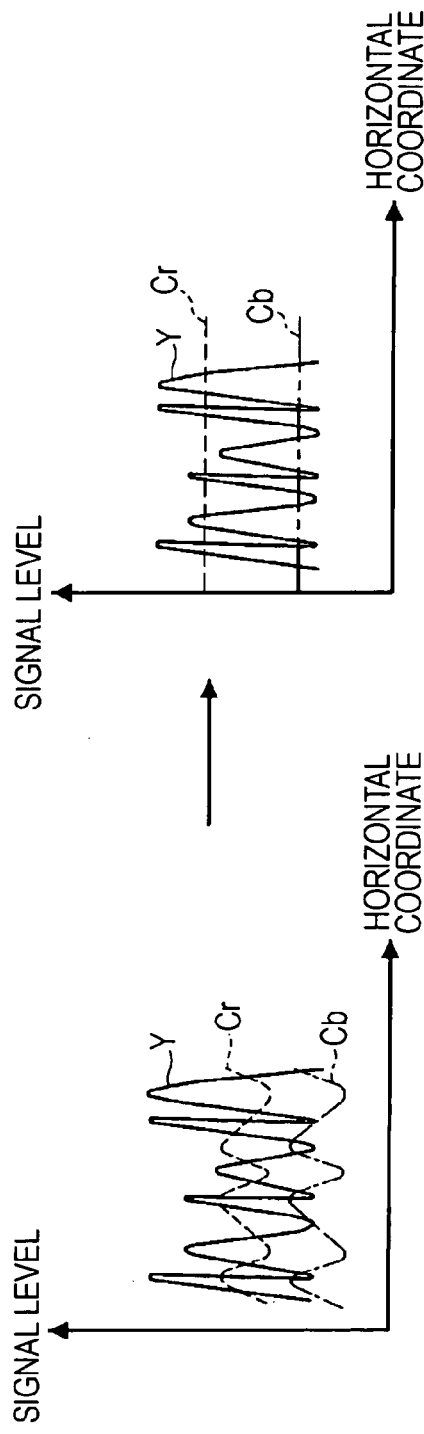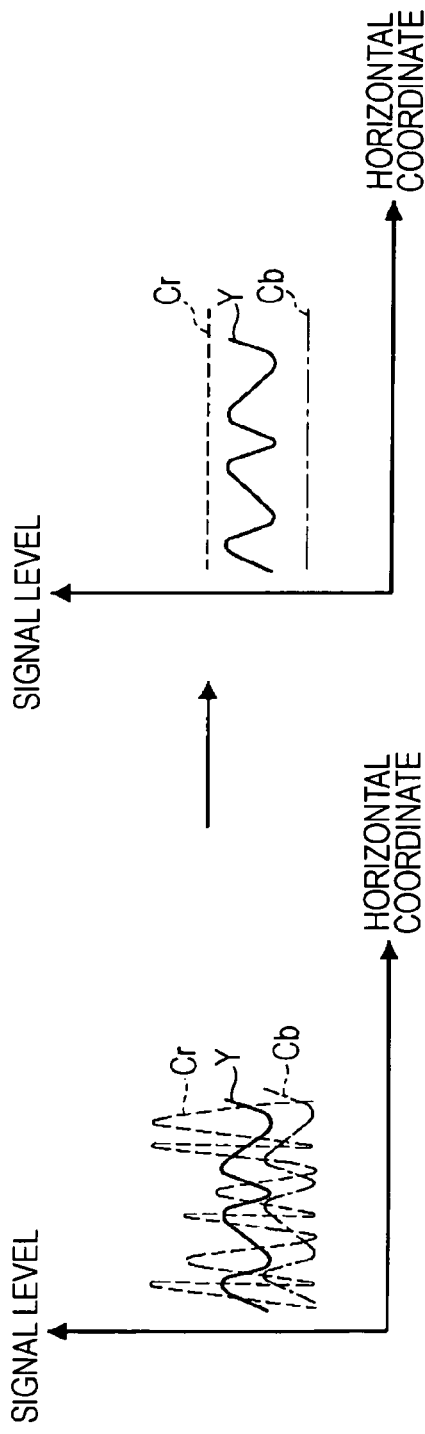

IMAGE PROCESSING APPARATUS, IMAGE PROCESSING METHOD, AND COMPUTER PROGRAM

CROSS-REFERENCE TO RELATED APPLICATION

The present application claims priority from Japanese Patent Application No. JP 2009-058251 filed in the Japanese Patent Office on Mar. 11, 2009, the entire content of which is incorporated herein by reference.

BACKGROUND OF THE INVENTION

1. Field of the Invention

The present invention relates to an image processing apparatus, an image processing method, and a computer program.

2. Description of the Related Art

RAW data output from a CCD (Charge Coupled Device) or a CMOS (Complementary Metal Oxide Semiconductor) used as an imaging element of a digital camera includes various noises. As a method of effectively removing noises, there is a method which changes a noise removal strength in consideration of a human visual feature (for example, see Japanese Unexamined Patent Application Publication No. 2004-151907).

For example, in the case where an image is developed by converting RAW data into signals of different formats, it is necessary to effectively remove noises included in the converted signals. For example, in the case where the RAW data is converted into image data (for example, YCC data) including a luminance signal and a color difference signal, a noise of an image is classified into a luminance noise and a color noise. In addition, a method is widely used which is capable of improving image quality by removing the color noise.

In the past, in order to remove the color noise, after obtaining the image data including the luminance signal and the color difference signal through the conversion, a noise reduction process is performed on the color difference signal so as to remove a noise therefrom. When such a noise reduction process is performed, it is possible to remove only the color noise while using the current luminance signal.

SUMMARY OF THE INVENTION

When the RAW data is converted into the image data including the luminance signal and the color difference signal, generally, a signal influencing a subject resolution is separated to the luminance signal. However, in accordance with the type of the subject, the signal influencing the subject resolution may be separated to the color difference signal instead of the luminance signal. In the case where such a subject is photographed, when the noise reduction process is performed on the color difference signal, a problem arises in that the subject resolution is degraded.

Therefore, it is desirable to provide an image processing apparatus, an image processing method, and a computer program, which are new or improved and are capable of suppressing a resolution from being degraded by changing a noise removal strength with respect to a color difference signal in accordance with a color of the color difference signal in an image signal including a color space having a luminance signal and a color difference signal.

According to an embodiment of the invention, there is provided an image processing apparatus including: a conversion unit converting a first color image signal including a predetermined color space into a second color image signal including a color space having a luminance signal and a color difference signal; a color determination section determining a color of each pixel of the first color image signal or the second color image signal; and a noise removal unit performing a noise removal process by changing a noise removal strength with respect to the color difference signal in accordance with the color determined by the color determination section.

With such a configuration, the conversion unit converts the first color image signal including the predetermined color space into the second color image signal including the color space having the luminance signal and the color difference signal, and the color determination section determines the color of each pixel of the first color image signal or the second color image signal. Then, the noise removal unit performs the noise removal by changing the noise removal strength with respect to the color difference signal in accordance with the color determined by the color determination section. As a result, since the noise removal is performed on the color difference signal in accordance with the color of the color difference signal in the image signal including the color space having the luminance signal and the color difference signal, it is possible to remove a noise of the image signal while suppressing a resolution from being degraded.

The noise removal unit may change the noise removal strength by changing a synthesis ratio between the color difference signal and a signal obtained by removing a noise from the color difference signal in accordance with the color determined by the color determination section.

The noise removal unit may change the noise removal strength by changing a range of a region of the image signal used for the noise removal process in accordance with the color determined by the color determination section.

The noise removal unit may change the noise removal strength by changing a threshold value used for the noise removal process in accordance with the color determined by the color determination section.

The conversion unit may convert the first color image signal into a Y signal as the luminance signal and Cr and Cb signals as the color difference signal.

The conversion unit may convert the first color image signal into a Y signal as the luminance signal and U and V signals as the color difference signals.

The predetermined color space may be an RGB color space.

According to another embodiment of the invention, there is provided an image processing method including the steps of: converting a first color image signal including a predetermined color space into a second color image signal including a color space having a luminance signal and a color difference signal; determining a color of each pixel of the first color image signal or the second color image signal; and performing a noise removal process by changing a noise removal strength with respect to the color difference signal in accordance with the color determined by the color determination section.

According to still another embodiment of the invention, there is provided a computer program causing a computer to execute the steps of: converting a first color image signal including a predetermined color space into a second color image signal including a color space having a luminance signal and a color difference signal; determining a color of each pixel of the first color image signal or the second color image signal; and performing a noise removal process by changing a noise removal strength with respect to the color difference signal in accordance with the color determined by the color determination section.

As described above, according to the embodiment of the invention, it is possible to provide an image processing apparatus, an image processing method, and a computer program, which are new or improved and are capable of suppressing a resolution from being degraded by changing a noise removal strength with respect to a color difference signal in accordance with a color of the color difference signal in an image signal including a color space having a luminance signal and a color difference signal.

BRIEF DESCRIPTION OF THE DRAWINGS

FIGS. 12A and 12B are diagrams conceptually illustrating a noise reduction process with respect to a color difference signal of the YCC data converted from the RAW data.

DESCRIPTION OF THE PREFERRED EMBODIMENTS

Figure 1:
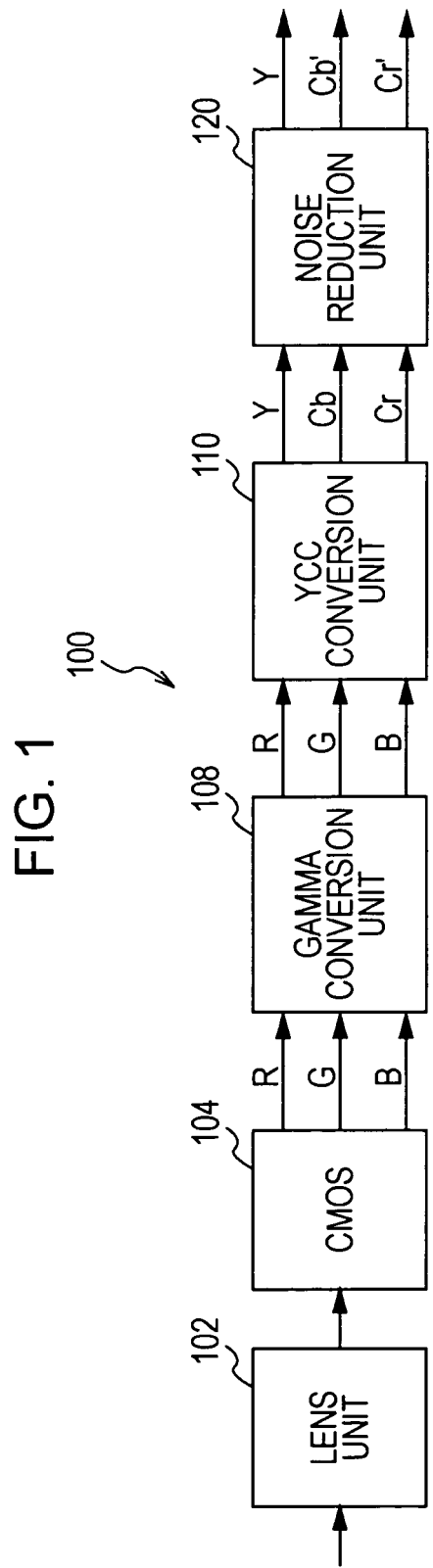
FIG. 1 is a diagram illustrating a configuration of an image capturing device according to an embodiment of the invention.

Hereinafter, a preferred embodiment of the invention will be described in detail with reference to the accompanying drawings. In addition, in the specification and the drawings, the same reference numerals will be given to the constituents substantially having the same functional configuration, and the repetitive description thereof will be omitted.

In addition, the preferred embodiment of the invention will be described in detail in the following order.

1. Embodiment of the invention
1-1. Configuration of image capturing device
1-2. Noise reduction process of the related art and problem thereof
1-3. Configuration of noise reduction unit according to embodiment of the invention
1-4. Noise reduction process
2. Conclusion
1. Embodiment of the Invention
1-1. Configuration of Image Capturing Device First, a configuration of an image capturing device according to the embodiment of the invention will be described. FIG. 1 is a diagram illustrating a configuration of an image capturing device 100 according to the embodiment of the invention.

Hereinafter, the configuration of the image capturing device 100 according to the embodiment of the invention will be described with reference to FIG. 1.

The image capturing device 100 is an example of an image processing apparatus according to the invention. The image capturing device 100 creates RAW data by converting light collected through a lens into an electric signal using an imaging element, and records image data by converting the RAW data into the image data including a luminance signal and a color difference signal. As shown in FIG. 1, the image capturing device 100 according to the embodiment of the invention includes a lens unit 102, a CMOS image sensor 104, a gamma conversion unit 108, an YCC conversion unit 110, and a noise reduction unit 120.

The lens unit 102 collects light from a subject. The lens unit 102 may include a zoom lens for changing a focal distance and a focus lens for bringing a subject into focus, or may include only the focus lens. The CMOS image sensor 104 is irradiated with the light collected by the lens unit 102 for a predetermined period of time when a photographer presses down a shutter button (not shown).

Figures 2, 3:
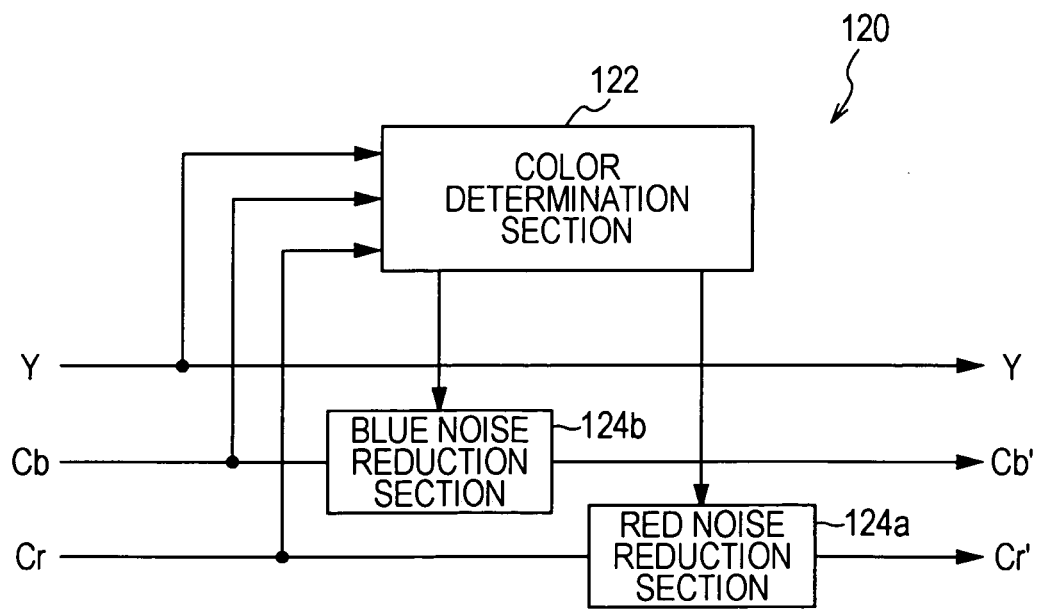
FIG. 2 is a diagram illustrating a Bayer array.
FIG. 3 is a diagram illustrating a configuration of a noise reduction unit according to the embodiment of the invention.

In the CMOS image sensor 104, the light collected by the lens unit 102 is converted into the signal in accordance with the intensity of light through a color filter for allowing a predetermined wavelength of light to pass therethrough for each pixel. The signal created by the CMOS image sensor 104 is used as the RAW data having color information. As shown in FIG. 2, the color filter of the CMOS image sensor 104 according to the embodiment is a color filter having a so-called Bayer array.

FIG. 2 is a diagram illustrating a Bayer array. As shown in FIG. 2, the Bayer array is a pixel array having a basic block of "two horizontal pixels×two vertical pixels". The Bayer array is a pixel array in which two green pixels (G) are disposed in one opposing angle and a red pixel (R) and a blue pixel (B) are disposed on the other opposing angle, where the basic block is periodically arranged.

The CMOS image sensor 104 creates the RAW data having color information of R, G, and B by converting the light collected by the lens unit 102 into the signal in accordance with the intensity of the light. The RAW data obtained by the CMOS image sensor 104 is subjected to a process such as a gain adjustment and A/D conversion, and is transmitted to the gamma conversion unit 108. Since the RAW data having color information of R, G, and B is created by the CMOS image sensor 104, the CMOS image sensor 104 is an example of a color image signal input unit according to the embodiment of the invention. In addition, in the embodiment of the invention, it is needless to say that the RAW data is not limited to the color image signal having a mosaic-shaped array as shown in FIG. 2. That is, the RAW data may have different types of arrays.

The gamma conversion unit 108 performs a gamma conversion process on the RAW data obtained by the CMOS image sensor 104. As the gamma conversion process of the gamma conversion unit 108, there are various methods. However, since the various methods are not directly involved with the contents of the embodiment of the invention, the detailed description thereof will be omitted herein. The RAW data subjected to the gamma conversion process of the gamma conversion unit 108 is transmitted to the YCC conversion unit 110.

The YCC conversion unit 110 converts the RAW data transmitted from the gamma conversion unit 108 into YCC (YCrCb) data. By using the YCC conversion unit 110, the RAW data is converted into a luminance signal (Y) and a color difference signal (Cr/Cb). There are various methods of converting the RAW data into the YCC data. However, since the various methods are directly involved with the contents of the embodiment of the invention, the detailed description thereof will be omitted herein. The YCC data obtained by the YCC conversion unit 110 is transmitted to the noise reduction unit 120.

The noise reduction unit 120 performs a noise reduction process on the YCC data obtained by the YCC conversion unit 110. The noise reduction unit 120 according to the embodiment performs the noise reduction process on the color difference signal of the YCC data. No change occurs in the luminance signal (Y) before and after the noise reduction unit 120. However, when the color signal (Cr/Cb) is input to the noise reduction unit 120, the color signal (Cr/Cb) is output as a signal (Cr'/Cb') in the state where a noise thereof is removed. The internal configuration of the noise reduction unit 120 will be described later.

As described above, the configuration of the image capturing device 100 according to the embodiment of the invention is described. In addition, in this embodiment, an example is described in which the CMOS image sensor is used as the image capturing device, but the invention is not limited to the example. For example, instead of the CMOS image sensor, a CCD (Charge Coupled Device) image sensor may be used. Next, a noise reduction process of the related art and a problem thereof will be described before the introduction of a configuration of a noise reduction unit 120 according to the embodiment of the invention.

1-2. Noise Reduction Process of the Related Art and Problem Thereof

Figure 8:
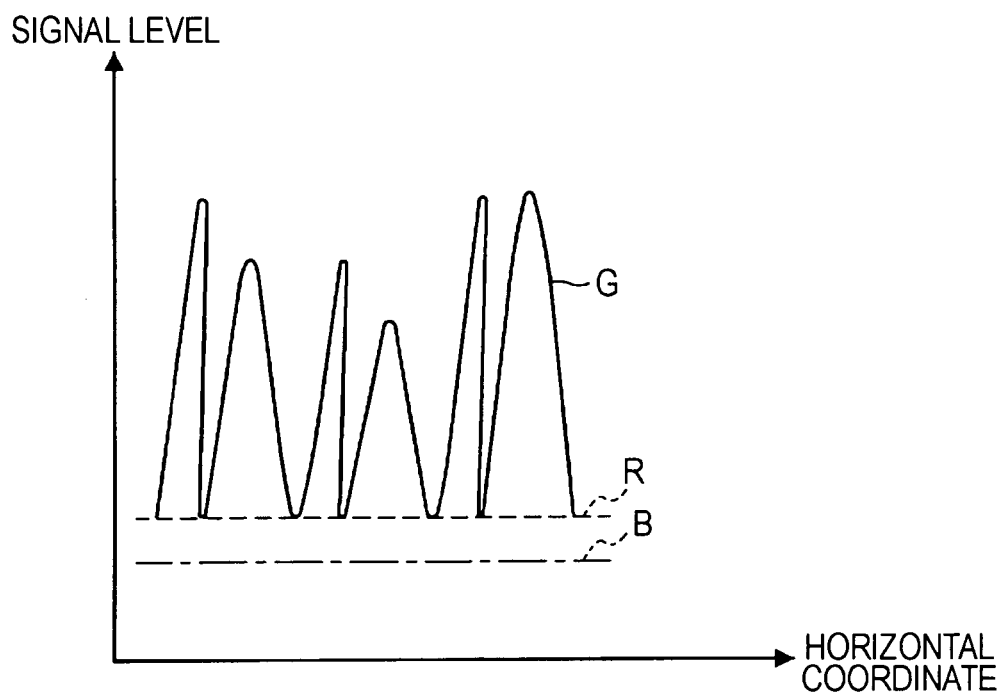
FIG. 8 is a graph illustrating an example of a signal level of RAW data.

Here, as shown in FIG. 1, a case will be supposed in which an all green subject, for example, a green knitting yarn ball is photographed by an image capturing device having a filter of three colors of R, G, and B. In this case, as the RAW data, a G signal of green is obtained as a signal having large amplitude compared with signals of other colors. Meanwhile, in this case, each of an R signal of red and a B signal of blue is obtained as a signal having small amplitude and an almost uniform value compared with the G signal of green. FIG. 8 is a graph illustrating an example of a signal level of the RAW data in the horizontal direction of a certain position in the case where the all green subject is photographed by the image capturing device having the filter of three colors of R, G, and B.

As shown in FIG. 8, in the case where the all green subject such as a green knitting yarn ball is photographed, as the RAW data, the G signal of green is obtained as a signal having large amplitude compared with signals of other colors. Meanwhile, each of the R signal of red and the B signal of blue is obtained as a signal having small amplitude and an almost uniform value compared with the G signal of green. The G signal of green having large amplitude compared with the signals of other colors is the base of the resolution of green. That is, in case of the green knitting yarn ball, the knitting yarn is the base of the recognition.

Figure 9:
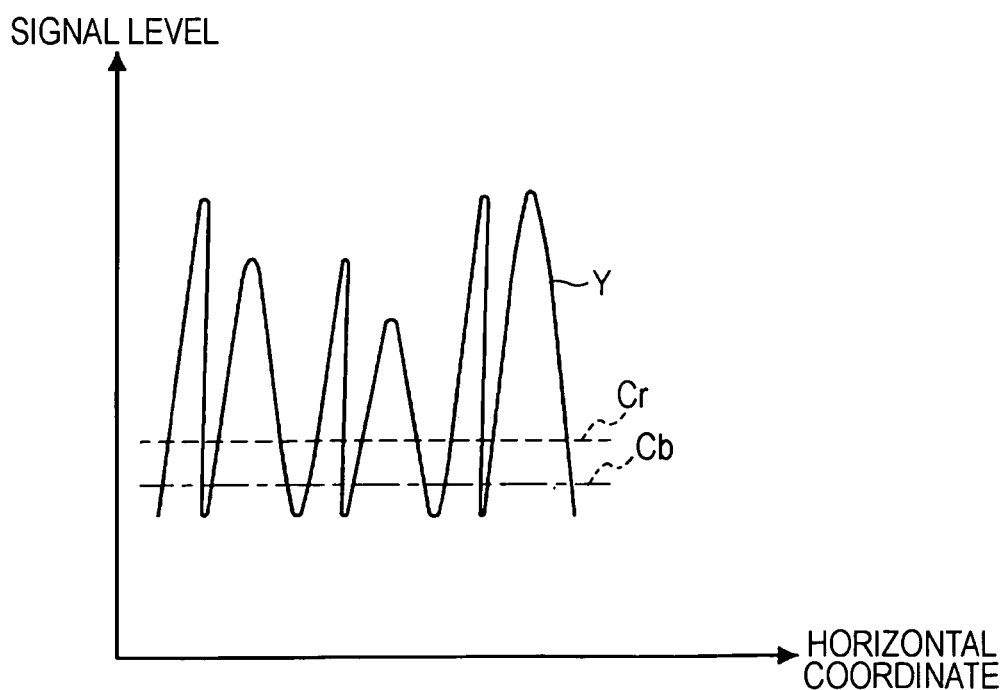
FIG. 9 is a graph illustrating an example of a case where RAW data is converted into YCC data.

When the RAW data having a characteristic shown in FIG. 8 is converted into the luminance signal (Y) and the color difference signal (Cr/Cb), the luminance signal is obtained as a signal having large amplitude compared with other signals as in the G signal of green. Meanwhile, the color difference signal is obtained as a signal having small amplitude and an almost uniform value compared with the luminance signal as in the R signal of red and the B signal of blue. FIG. 9 is a graph showing an example of the case where the RAW data having the signal level shown in FIG. 8 is converted into the YCC data.

As shown in FIG. 9, in the case where the all green subject such as a green knitting yarn ball is photographed, as the YCC data, the luminance signal is obtained as a signal having large amplitude compared with other signals as in the G signal of green. Meanwhile, the color difference signal is obtained as a signal having small amplitude and an almost uniform value compared with the luminance signal as in the R signal of red and the B signal of blue. That is, a signal influencing the resolution of green is separated to the luminance signal, and a signal influencing the resolution of green is not separated to the color difference signal.

Figure 10:
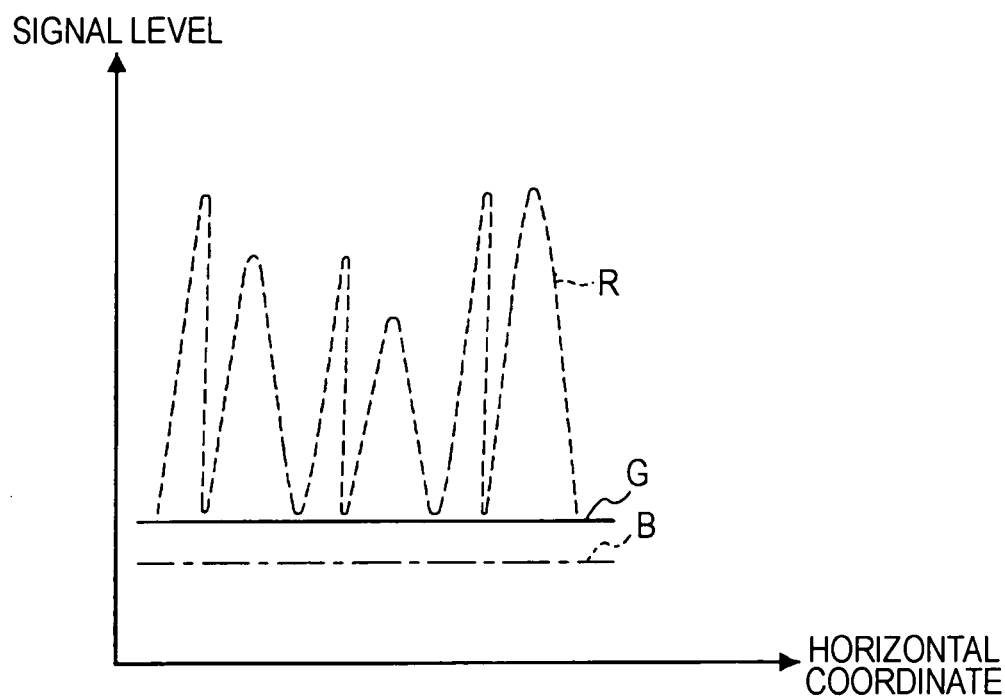
FIG. 10 is a graph illustrating an example of a signal level of the RAW data in the horizontal direction.

However, in the case where an all red subject, for example, a red knitting yarn ball is photographed by the image capturing device having the filter of three colors of R, G, and B, a result different from the case of photographing the all green subject is obtained. In this case, as the RAW data, the R signal of red is obtained as a signal having large amplitude compared with other signals, but each of the G signal of green and the B signal of blue is obtained as a signal having small amplitude and an almost uniform value compared with the R signal. FIG. 10 is a graph illustrating an example of the signal level of the RAW data in the horizontal direction of a certain position in the case where the all red subject is photographed by the image capturing device having the filter of three colors of R, G, and B.

The all red subject such as a red knitting yarn ball has a large amount of red light, but has a small amount of green and blue light. Accordingly, in the case where the all red subject such as a red knitting yarn ball is photographed, as shown in FIG. 10, as the RAW data, the R signal of red is obtained as a signal having large amplitude compared with other signals, but each of the G signal of green and the B signal of blue is obtained as a signal having small amplitude and an almost uniform value compared with the R signal. The R signal of red having large amplitude compared with other signals is the base of the resolution of red. That is, in case of the red knitting yarn ball, the knitting yarn is the base of the recognition.

Figure 11:
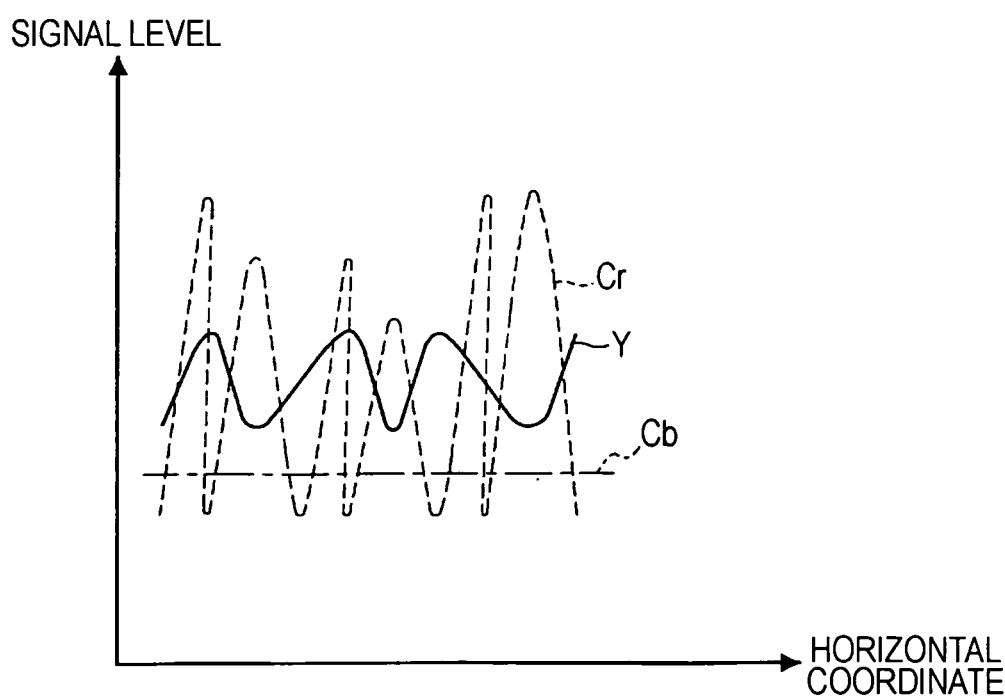
FIG. 11 is a graph illustrating an example of a case where the RAW data shown in FIG. 10 is converted into YCC data.

When the RAW data having a characteristic shown in FIG. 10 is converted into the luminance signal (Y) and the color difference signal (Cr/Cb), the luminance signal is obtained as a signal having large amplitude compared with the Cb data. In the color difference signal, the Cr data is obtained as a signal having large amplitude compared with the Cb data as in the R signal of red, but the Cb data is obtained as a signal having small amplitude and an almost uniform value compared with other signals as in the B signal of blue. FIG. 11 is a graph illustrating an example of the case where the RAW data having the signal level shown in FIG. 10 is converted into the YCC data. As shown in FIG. 11, in the case where the all red subject is photographed, in the YCC data, differently from the case where the all green subject is photographed, a signal influencing the resolution of red is not separated to the luminance signal, but is separated to the color difference signal. This phenomenon may occur in the case where the all blue subject is photographed as well as the case where the all red subject is photographed.

For this reason, when the noise reduction process is performed on the color difference signal of the YCC data so as to remove only the color noise, the resolution of the color may disappear in accordance with the color of the subject. FIGS. 12A and 12B are diagrams conceptually illustrating the noise reduction process with respect to the color difference signal of the YCC data converted from the RAW data. FIG. 12A illustrates the noise reduction process with respect to the YCC data in the case where a general subject is photographed. In addition, FIG. 12B illustrates the noise reduction process with respect to the YCC data in the case where an all red subject such as a red knitting yarn ball is photographed.

As shown in FIG. 12A, in the case where the general subject is photographed, when the noise reduction process is performed on the color difference signal, it is possible to remove a noise of the color difference signal while maintaining the amplitude of the luminance signal. Accordingly, in the case where the general subject is photographed, when the noise reduction process is performed on the color difference signal, it is possible to remove a noise of the color difference signal while maintaining the amplitude of the luminance signal.

However, as shown in FIG. 12B, in the case where the all red subject such as a red knitting yarn ball is photographed, when the noise reduction process is performed as in the case of the case where the general subject is photographed, the amplitude of the color difference signal disappears, and the luminance signal having small amplitude is left. Accordingly, since the amplitude of the color difference signal influencing the resolution of red disappears, it is possible to remove the color noise, but the resolution of red is degraded.

Therefore, the noise reduction process using the noise reduction unit 120 according to the embodiment is advantageous in that the noise reduction strength is changed in accordance with the color of the pixel. When the noise reduction strength is changed in accordance with the color of the pixel, the color noise is removed while suppressing the resolution of the color from being degraded. Subsequently, the configuration of the noise reduction unit 120 according to the embodiment of the invention will be described.

1-3. Configuration of Noise Reduction Unit According to Embodiment of the Invention FIG. 3 is a diagram illustrating the configuration of the noise reduction unit 120 according to the embodiment of the invention. Hereinafter, the configuration of the noise reduction unit 120 according to the embodiment of the invention will be described with reference to FIG. 3.

As shown in FIG. 3, the noise reduction unit 120 according to the embodiment of the invention includes a color determination section 122, a red noise reduction section 124a, and a blue noise reduction section 124b.

The color determination section 122 determines the color of each pixel on the basis of the luminance signal and the color difference signal of the YCC data. The color determination result of each pixel in the color determination section 122 is transmitted to the red noise reduction section 124a and the blue noise reduction section 124b.

Various methods may be used as a color determination process of the color determination section 122. For example, the color determination section 122 may determine the color of each pixel on the basis of a signal level of the luminance signal and the color difference signal of the YCC data.

The red noise reduction section 124a performs the noise reduction process on the Cr signal of the color difference signal of the YCC data. When the noise reduction process is performed by the red noise reduction section 124a, the Cr' signal obtained by removing a noise from the Cr signal is output from the red noise reduction section 124a. The red noise reduction section 124a changes the noise reduction strength with respect to the Cr signal in accordance with the color determination result of the color determination section 122.

The blue noise reduction section 124b performs the noise reduction process on the Cb signal of the color difference signal of the YCC data. When the noise reduction process is performed by the blue noise reduction section 124b, the Cb' signal obtained by removing a noise from the Cb signal is output from the blue noise reduction section 124b. As in the red noise reduction section 124a, the blue noise reduction section 124b changes the noise reduction strength with respect to the Cb signal in accordance with the color determination result of the color determination section 122.

The red noise reduction section 124a and the blue noise reduction section 124b respectively change the noise reduction strength with respect to the Cr signal and the Cb signal in accordance with the color determination result of the color determination section 122. The noise reduction strength of each of the red noise reduction section 124a and the blue noise reduction section 124b is able to be changed by various methods. In the following description, an example is described in which the noise reduction strength is changed by changing a synthesis ratio between the signals before and after the noise reduction process.

Figure 4:
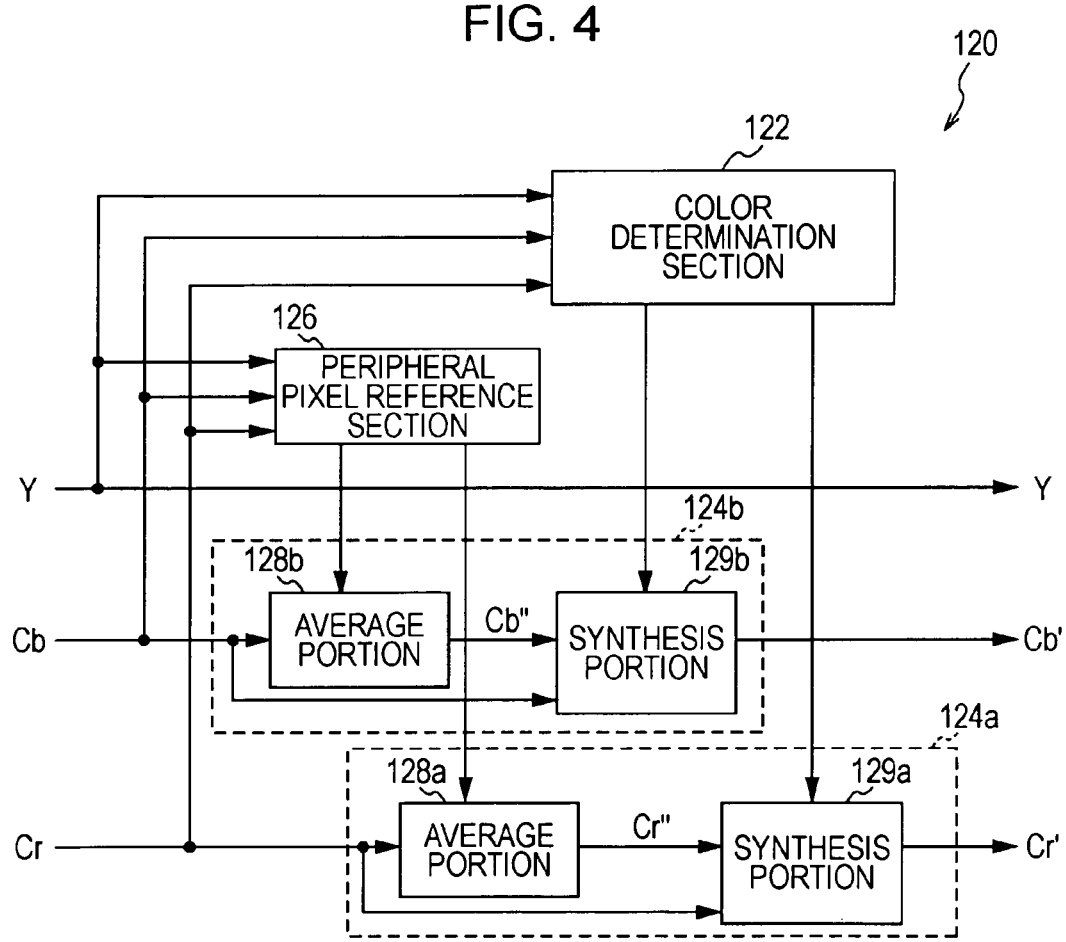
FIG. 4 is a diagram illustrating a configuration example of a red noise reduction section and a blue noise reduction unit.

Various methods may be used as the noise reduction process of the red noise reduction section 124a and the blue noise reduction section 124b. In the embodiment, as an example of the noise reduction process, a noise reduction process is adopted which removes a noise by determining a color of a pixel in the periphery of a noise removal target pixel. FIG. 4 is a diagram illustrating a configuration example of the red noise reduction section 124a and the blue noise reduction section 124b. FIG. 4 also shows a configuration of the red noise reduction section 124a and the blue noise reduction section 124b. Hereinafter, the configuration example of the red noise reduction section 124a and the blue noise reduction section 124b will be described with reference to FIG. 4.

As shown in FIG. 4, the red noise reduction section 124a includes an average portion 128a and a synthesis portion 129a. In the same manner, the blue noise reduction section 124b includes an average portion 128b and a synthesis portion 129b. In addition, as shown in FIG. 4, the noise reduction unit 120 further includes a peripheral pixel reference section 126.

The peripheral pixel reference section 126 refers to a pixel (hereinafter, the pixel in a predetermined range in the periphery of the target pixel is referred to as the "peripheral pixel") in a predetermined range in the periphery of the noise removal target pixel (hereinafter, the noise removal target pixel is referred to as the "target pixel"). In addition, the peripheral pixel reference section 126 obtains color information of the peripheral pixel used as a reference. When the peripheral pixel reference section 126 obtains the color information of the peripheral pixel in the periphery of the target pixel, the peripheral pixel reference section 126 transmits the obtained color information of the peripheral pixel to the red noise reduction section 124a and the blue noise reduction section 124b.

The YCC data converted by the YCC conversion unit 110 is input to the peripheral pixel reference section 126. The peripheral pixel reference section 126 obtains the color information of the peripheral pixel of the target pixel by using the YCC data converted by the YCC conversion unit 110. When the peripheral pixel reference section 126 obtains the color information of the peripheral pixel, it is possible to obtain the number or positions of the pixels having substantially the same color as that of the target pixel. In addition, in the peripheral pixels, the pixel substantially having the same color as that of the target pixel may be determined, for example, by comparing the signal level of the YCC data of two pixels. In detail, for example, the determination may be performed by determining whether a difference between the signal level of the YCC data of the target pixel and the signal level of the YCC data of the pixel is included in a predetermined range.

Figure 5:
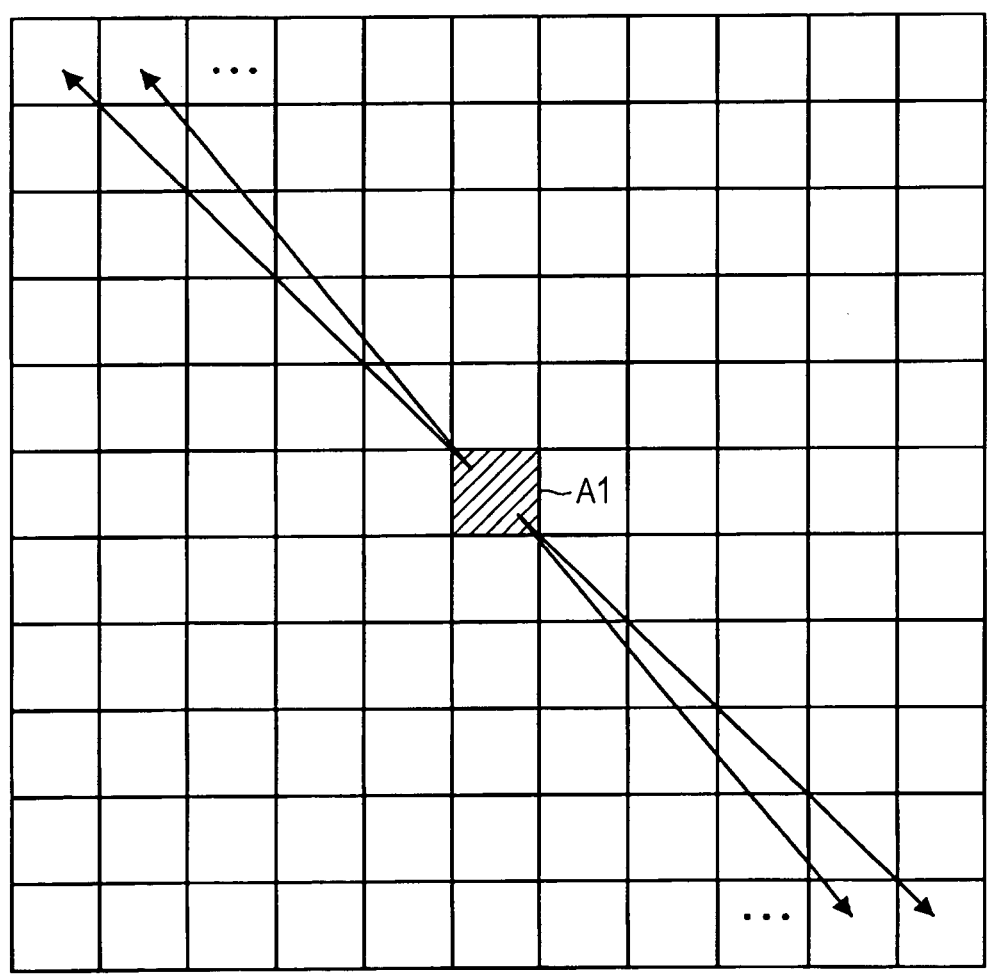
FIG. 5 is a diagram showing an example of a reference of a peripheral pixel in the periphery of a target pixel in a peripheral pixel reference section according to the embodiment of the invention.

FIG. 5 is a diagram illustrating an example of the reference of the peripheral pixel in the periphery of the target pixel of the peripheral pixel reference section 126 according to the embodiment of the invention. FIG. 5 shows an example in which five pixels around a target pixel A1 in the vertical and horizontal directions are referred as the peripheral pixels. Of course, it is needless to say that the range of the peripheral pixels referred by the peripheral pixel reference section 126 is not limited to the example shown in FIG. 5.

When the peripheral pixel reference section 126 refers to the color information of the peripheral pixel, it is possible to recognize the situation of the color in the periphery of the target pixel A1. In addition, when the peripheral pixel reference section 126 refers to the color information of the peripheral pixel, it is possible to discriminate a position or direction of the edge.

The average portion 128a receives the color information of the peripheral pixel of the peripheral pixel reference section 126 and the Cr signal included in the YCC data converted by the YCC conversion unit 110, calculates an average value of the target pixel of each Cr signal and the peripheral pixel of the Cr signal, and then outputs the result. The average portion 128a may calculate the average value in such a manner that the pixel level of the peripheral pixel substantially having the same color as that of the target pixel is added, and the sum of the added pixel levels is divided by the number of the addition. When the average portion 128a calculates the average value of the color with respect to the Cr signal, a noise of the Cr signal is removed. Here, the signal obtained by removing a noise and output from the average portion 128a is referred to as a Cr" signal.

The average portion 128b receives the color information of the peripheral pixel of the peripheral pixel reference section 126 and the Cb signal included in the YCC data converted by the YCC conversion unit 110, calculates an average value of the target pixel of each Cb signal and the peripheral pixel of the Cb signal, and then outputs the result. As in the average portion 128a, the average portion 128b may calculate the average value in such a manner that the pixel level of the peripheral pixel substantially having the same color as that of the target pixel is added, and the sum of the added pixel levels is divided by the number of the addition. When the average portion 128b calculates the average value of the color with respect to the Cb signal, a noise of the Cb signal is removed. Here, the signal obtained by removing a noise and output from the average portion 128b is referred to as a Cb" signal.

The synthesis portion 129a receives the Cr signal included in the YCC data converted by the YCC conversion unit 110 and the Cr" signal output from the average portion 128a, synthesizes the Cr signal and the Cr" signal in accordance with a predetermined ratio by the unit of pixel, and then outputs the result. Here, the signal output from the synthesis portion 129a is referred to as a Cr' signal. In the same manner, the synthesis portion 129b receives the Cb signal included in the YCC data converted by the YCC conversion unit 110 and the Cb" signal output from the average portion 128b, synthesizes the Cb signal and the Cb" signal in accordance with a predetermined ratio by the unit of pixel, and then outputs the result. Here, the signal output from the synthesis portion 129b is referred to as a Cb' signal.

The predetermined synthesis ratio of the synthesis portion 129a and 129b is changed in accordance with the color determination result of the target pixel of the color determination section 122. For example, the color of the target pixel is determined as red as the color determination result of the target pixel of the color determination section 122. In this case, the synthesis portion 129a synthesizes the Cr signal with the Cr" signal in accordance with a predetermined ratio. The predetermined ratio may be, for example, 1:1. When the synthesis portion 129a synthesizes the Cr signal having a noise with the Cr" signal obtained by removing a noise in accordance with a predetermined ratio, the Cr' signal is output as the synthesis result. On the other hand, the synthesis portion 129b directly outputs the Cb" signal as the Cb' signal. That is, when it is determined that the color of the target pixel is red as the color determination result of the target pixel of the color determination section 122, the noise removal strength with respect to the Cr signal is weakened to thereby output the Cr' signal. The noise removal strength with respect to the Cr signal is strengthened in a direction in which the synthesis is performed to increase the ratio of the Cr" signal, and is weakened in a direction in which the synthesis is performed to increase the ratio of the Cr signal. Meanwhile, regarding the Cb signal, the noise removal may be performed at the current strength to thereby output the Cb' signal. In addition, in the case where the color of the target pixel is red, the synthesis portion 129b may directly output the Cb" signal as the Cb' signal, and may output a result obtained by synthesizing the Cb signal with the Cb" signal. Here, in the case where the Cb signal is synthesized with the Cb" signal, the synthesis may be performed so that the ratio of the Cb" signal increases (for example, at a ratio of 3:7).

In addition, in the case where the color of the target pixel is determined as blue as the color determination result of the target pixel of the color determination section 122, the Cb' signal may be output by weakening the noise removal strength with respect to the Cb signal. The noise removal strength with respect to the Cb signal is strengthened in a direction in which the synthesis is performed to increase the ratio of the Cb" signal, and is weakened in a direction in which the synthesis is performed to increase the ratio of the Cb signal. Meanwhile, regarding the Cr signal, the noise removal may be performed at the current strength to thereby output the Cr' signal. In addition, the synthesis portion 129a or 129b may change the synthesis ratio of two signals in accordance with the signal level of the Cr signal or the Cb signal.

Likewise, when the color of the target pixel is determined by the color determination section 122, and the noise removal strength is changed in accordance with the determination result, it is possible to perform the noise removal while suppressing the resolution from being degraded. In addition, the state will be described later in which the noise removal is performed while suppressing the resolution from being degraded as a result of the noise reduction process of the noise reduction unit 120 according to the embodiment of the invention.

As described above, the configuration of the noise reduction unit 120 according to the embodiment of the invention is described with reference to FIGS. 4 and 5. Next, the noise reduction process using the image capturing device 100 according to the embodiment of the invention will be described.

1-4. Noise Reduction Process

Figure 6:
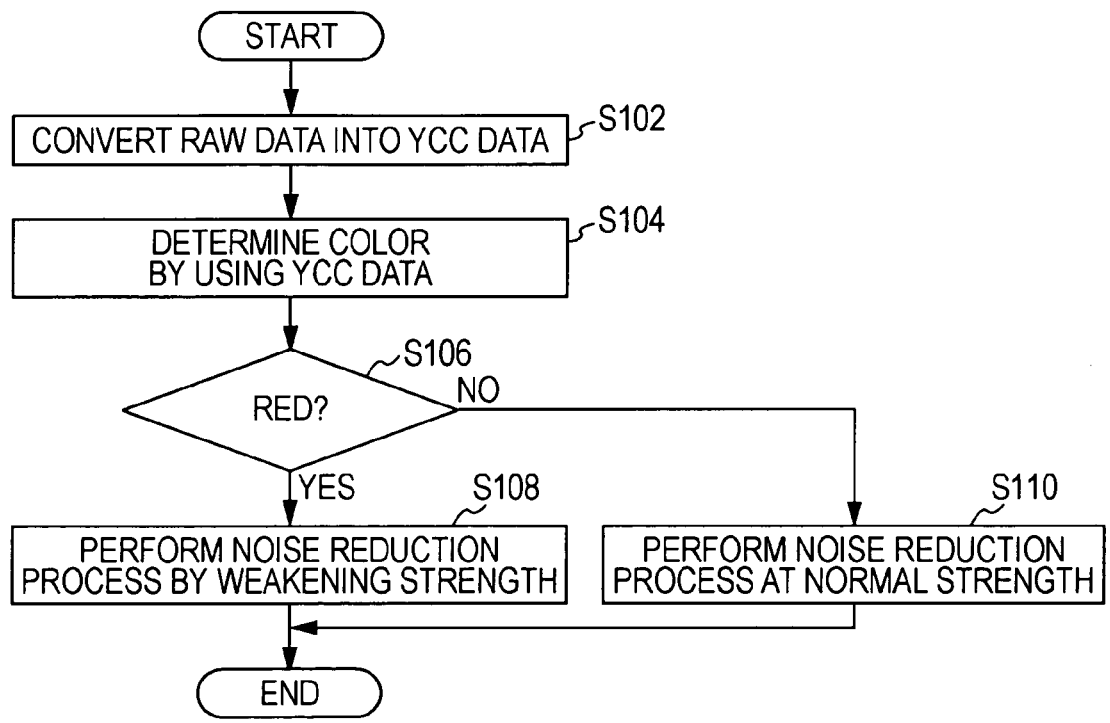
FIG. 6 is a flowchart illustrating a noise reduction process using the image capturing device according to the embodiment of the invention.

FIG. 6 is a flowchart illustrating a noise reduction process using the image capturing device 100 according to the embodiment of the invention. Hereinafter, the noise reduction process using the image capturing device 100 according to the embodiment of the invention will be described with reference to FIG. 6.

When an image capturing process is performed by the image capturing device 100 in accordance with the photographer's operation, the CMOS image sensor 104 is irradiated with light from the subject through the lens unit 102. A photoelectric conversion is performed in the CMOS image sensor 104. Then, when the photoelectric conversion is performed in the CMOS image sensor 104 including the color filter having the Bayer array shown in FIG. 2, the RAW data having color information of R, G, and B is created.

The created RAW data is subjected to a gamma conversion process in the gamma conversion unit 108, so that the RAW data is converted into the YCC data including the luminance signal (Y) and the color difference signal (Cr/Cb) in the YCC conversion unit 110 (Step S102).

When the RAW data is converted into the YCC data in the YCC conversion unit 110, the YCC conversion unit 110 transmits the converted YCC data to the noise reduction unit 120. The noise reduction unit 120 receives the YCC data from the YCC conversion unit 110, and performs the noise reduction process on the received YCC data.

In the noise reduction unit 120, the color determination section 122 determines the color of each pixel by using the YCC data input to the noise reduction unit 120 (Step S104). The color determination result of the color determination section 122 is transmitted to the red noise reduction section 124a and the blue noise reduction section 124b.

In FIG. 6, a case is shown in which the noise reduction process is performed on the pixel displaying red. Here, the color determination section 122 determines whether the pixel (target pixel) to be subjected to the noise reduction process is a pixel displaying red (Step S106). Whether the target pixel is a pixel displaying red may be determined on the basis of, for example, whether the signal levels of the Y signal, the Cr signal, and the Cb signal are included in a predetermined range.

In the case where it is determined that the target pixel to be subjected to the noise reduction process is a pixel displaying red as the determination result in Step S106, the color determination section 122 commands the synthesis portion 129a to change the synthesis ratio of the Cr signal and the Cr" signal. That is, the color determination section 122 commands the red noise reduction section 124a to weaken the noise reduction strength (Step S108). In accordance with the command of the color determination section 122, the synthesis portion 129a changes the synthesis ratio of the Cr signal and the Cr" signal in a direction in which the ratio of the Cr signal increases. When the synthesis ratio of the Cr signal and the Cr" signal is changed in a direction in which the ratio of the Cr signal increases in accordance with the command from the color determination section 122, it is possible to weaken the noise removal strength.

In addition, in the case where it is determined that the target pixel subjected to the noise reduction process is a pixel displaying red as the determination result in Step S106, the color determination section 122 commands the synthesis portion 129b to directly output the Cb" signal. Regarding the Cb signal, even when the signal (Cb") signal) obtained by removing a noise using the average portion 128b is directly output, the resolution of red is not influenced.

On the other hand, in the case where it is determined that the target pixel subjected to the noise reduction process is not a pixel displaying red as the determination result in Step S106, the color determination section 122 commands the synthesis portions 129a and 129b to output the Cr" signal and the Cb" signal. That is, the color determination section 122 commands the synthesis portions 129a and 129b to directly output signals (the Cr" signal and the Cb" signal) obtained by removing a noise using the average portions 128a and 128b as the Cr' signal and the Cb' signal. That is, the color determination section 122 commands the red noise reduction section 124a and the blue noise reduction section 124b to perform the noise reduction process at a normal strength (Step S110).

Likewise, the noise reduction strength of the red noise reduction section 124a is changed in accordance with whether the target pixel to be subjected to the noise reduction process is a pixel displaying red. When the noise reduction strength of the red noise reduction section 124a is changed in accordance with the color displayed by the pixel, it is possible to remove a noise without degrading the resolution of red. In addition, in Step S110, an example is described in which the signals (the Cr" signal and the Cb" signal) obtained by removing a noise using the average portions 128a and 128b are directly output as the Cr' signal and the Cb' signal, but the invention is not limited thereto. For example, the Cr signal may be synthesized with the Cr" signal in the synthesis portion 129a, and the Cb signal may be synthesized with the Cb" signal in the synthesis portion 129b so that the ratio of the Cr" signal or the Cb" signal increases.

Figure 7:
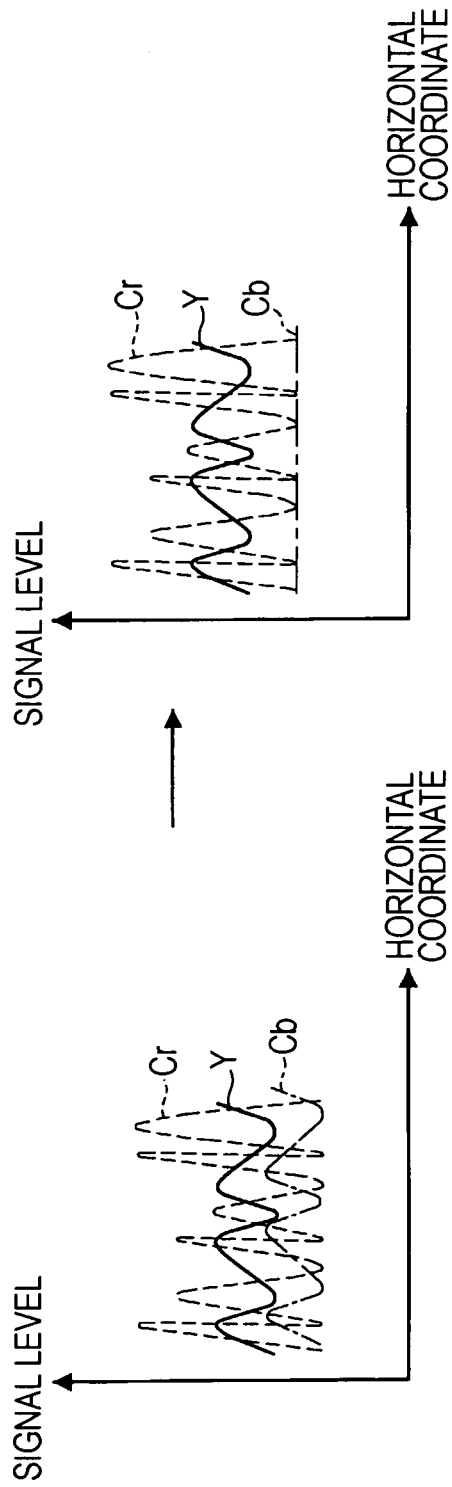
FIG. 7 is a diagram illustrating an example of a variation in signal level of each signal of YCC data before and after the noise reduction process.

FIG. 7 is a diagram illustrating an example of a variation in signal level of each signal of YCC data before and after the noise reduction process using the noise reduction unit 120. As in the case shown in FIG. 12B, FIG. 7 shows the noise reduction process using the noise reduction unit 120 in the case where an all red subject such as a red knitting yarn ball is photographed.

As shown in FIG. 7, when the noise reduction process using the noise reduction unit 120 according to the embodiment of the invention is performed, as in the case shown in FIG. 12B, a noise of the Cb signal is removed, and the Cb signal has a signal level which is flat in any horizontal coordinate. On the other hand, differently from the case shown in FIG. 12B, a noise of the Cr signal is not removed, and the signal level thereof has different values in accordance with the coordinate. Likewise, when the waveform of the signal level of the Cr signal is maintained, the resolution of red is not degraded. Accordingly, when the noise reduction process using the noise reduction unit 120 according to the embodiment of the invention is performed, it is possible to obtain an image, of which the resolution of red is not degraded, while increasing the resolution of the image.

As described above, the noise reduction process using the image capturing device 100 according to the embodiment of the invention is described. In addition, in the above description, an example is described in which the noise reduction process is performed in the case where the all red subject such as a red knitting yarn ball is photographed. However, even in the case where the all blue subject such as a blue knitting yarn ball is photographed, it is possible to perform the noise reduction process using the image capturing device 100.

2. Conclusion

As described above, according to the invention, the RAW data is converted into the YCC data in the YCC conversion unit 110, and the YCC data is transmitted to the noise reduction unit 120 so that the noise reduction process is performed on the YCC data. During the noise reduction process, the color determination section 122 determines the color of each pixel by using the YCC data. In addition, in the case where the target pixel is a pixel displaying red as the color determination result of the color determination section 122, the red noise reduction section 124a outputs the Cr signal by weakening the noise reduction strength. As a result, in the noise reduction process using the image capturing device 100 according to the embodiment of the invention, it is possible to improve the resolution of the image quality without degrading the resolution of red which is degraded in the noise reduction process of the related art. In the noise reduction process using the image capturing device 100 according to the embodiment of the invention, it is possible to obtain a remarkable advantage particularly in red of the dispersion of the R filter and blue of the dispersion of the B filter of the CMOS image sensor 104.

In addition, in the embodiment, an example is described in which the color filter having three colors of R, G, and B is used as the color filter of the CMOS image sensor 104, but in the invention, the color filer of the image sensor is not limited to the example. In the case where a color filter different from the color filter having three colors of R, G, and B is used, it is possible to improve the resolution of the image quality without degrading the resolution in such a manner that the noise reduction process is weakly performed in accordance with the color of the filter.

Further, the noise reduction process using the image capturing device 100 according to the embodiment of the invention may be realized by hardware or software. In the case where the noise reduction process is performed by software, for example, a storage medium having a program stored thereon may be built in the image capturing device 100. In addition, such a program may be read by a CPU (Central Processing Unit), DSP (Digital Signal Processor), and other controllers, and may be sequentially executed.

While the preferred embodiment of the invention has been described with reference to the accompanying drawings, the invention is not limited thereto. It should be understood by those skilled in the art that various modifications and alterations may occur within the scope of the technical spirit of the appended claims and they are within the scope of the technical scope of the invention.

For example, in the above-described embodiment, an example is described in which the noise reduction unit 120 is provided in the image capturing device 100, and the noise reduction process is performed on the image data obtained by the image capturing device 100 in the inside of the image capturing device 100, but the invention is not limited thereto. For example, the RAW data obtained by the image capturing process of the image capturing device may be input to a color image signal input unit provided in an information processing apparatus other than a personal computer through a storage medium having the RAW data stored thereon or a network. In addition, the information processing apparatus receiving the RAW data may include the YCC conversion unit 110 and the noise reduction unit 120 described in the above-described embodiment, and the noise reduction process may be performed in the information processing apparatus.

For example, in the above-described embodiment, in the case where the YCC data is input to the color determination section 122, and the target pixel is a pixel displaying red (or blue) as the color determination result of the color determination section 122, the color determination section 122 commands the red noise reduction section 124a (or the blue noise reduction section 124b) to weaken the noise removal strength. However, the invention is not limited to the example. For example, in the case where the target pixel is a pixel displaying red as the color determination result of the color determination section 122, the color determination section 122 may command the blue noise reduction section 124b to strengthen the noise removal strength. That is, the color determination section 122 may transmit a command to the blue noise reduction section 124b so that the noise removal strength of the red noise reduction section 124a is relatively weakened.

For example, in the above-described embodiment, an example is described in which the peripheral pixel reference section 126 refers to five pixels around the target pixel A1 in the horizontal and vertical directions, but the invention is not limited to the example. For example, in accordance with the color determination result of the color determination section 122, the reference range of the peripheral pixel may be changed. In the case where the target pixel is a pixel displaying red (or blue) as the color determination result of the color determination section 122, the noise removal strength may be weakened by narrowing the reference range of the peripheral pixel.

For example, in the above-described embodiment, the peripheral pixel reference section 126 refers to the peripheral pixel of the target pixel A1, and the average portions 128a and 128b calculate the average value of the pixels substantially having the same color as that of the target pixel A1. Here, in the invention, in accordance with the color determination result of the color determination section 122, a threshold value used by the average portions 128a and 128b to determine whether the color of the peripheral pixel is substantially the same as that of the target pixel A1 may be changed. In the case where it is determined that the target pixel is a pixel displaying red (or blue) in accordance with the color determination result of the color determination section 122, the threshold value for determining whether the color of the peripheral pixel is substantially the same as that of the target pixel A1 may be changed, and only the pixels more substantially having the same color as that of the target pixel may be set to a calculation target.

For example, in the above-described embodiment, an example is described in which the RAW data having the RGB color space is converted into the YCC data having the YCrCb color space, and the noise reduction process is performed on the YCC data, but the invention is not limited to the example. For example, the noise reduction process may be performed in such a manner that the color of the target pixel is determined from the color image signal having a color space different from the YUV and Lab color spaces other than YCbCr, and a predetermined color is weakened in accordance with the determination result.

For example, in the above-described embodiment, an example is described in which the YCC data is input to the color determination section 122, and the color determination process is performed on each pixel by using the YCC data, but the invention is not limited thereto. For example, the color determination process for each pixel may be performed by using the RAW data. The color determination process may be performed by using the RAW data, the RAW data may be converted into the color image signal (for example, the color image signal having the YUV color space) having the luminance signal and the color difference signal, and then the color determination result using the RAW data may be used as the color of each pixel of the color image signal.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a conversion unit converting a first color image signal including a predetermined color space into a second color image signal including a color space having a luminance signal and a color difference signal;
a color determination section determining a color of each pixel of the first color image signal or the second color image signal; and
a noise removal unit performing a noise removal process by changing a noise removal strength with respect to the color difference signal in accordance with a result of a determination whether the color determined by the color determination section is a predetermined color.

2. The image processing apparatus according to claim 1, wherein the noise removal unit changes the noise removal strength by changing a synthesis ratio between the color difference signal and a signal obtained by removing a noise from the color difference signal in accordance with the color determined by the color determination section.

3. The image processing apparatus according to claim 1, wherein the noise removal unit changes the noise removal strength by changing a range of a region of the image signal used for the noise removal process in accordance with the color determined by the color determination section.

4. The image processing apparatus according to claim 1, wherein the noise removal unit changes the noise removal strength by changing a threshold value used for the noise removal process in accordance with the color determined by the color determination section.

5. The image processing apparatus according to claim 1, wherein the conversion unit converts the first color image signal into a Y signal as the luminance signal and Cr and Cb signals as the color difference signal.

6. The image processing apparatus according to claim 1, wherein the conversion unit converts the first color image signal into a Y signal as the luminance signal and U and V signals as the color difference signals.

7. The image processing apparatus according to claim 1, wherein the predetermined color space is an RGB color space.

8. An image processing method comprising the steps of:
converting a first color image signal including a predetermined color space into a second color image signal including a color space having a luminance signal and a color difference signal;
determining a color of each pixel of the first color image signal or the second color image signal; and
performing a noise removal process by changing a noise removal strength with respect to the color difference signal in accordance with a result of a determination whether the color determined by the color determination section is a predetermined color.

9. A non-transitory recording medium on which is recorded a computer program causing a computer to execute the steps of:
converting a first color image signal including a predetermined color space into a second color image signal including a color space having a luminance signal and a color difference signal;
determining a color of each pixel of the first color image signal or the second color image signal; and
performing a noise removal process by changing a noise removal strength with respect to the color difference signal in accordance with a result of a determination whether the color determined by the color determination section is a predetermined color.

10. An image processing apparatus comprising:
a conversion unit converting a first color image signal including a predetermined color space into a second color image signal including a color space having a luminance signal and a color difference signal;
a color determination section determining a color of each pixel of the first color image signal or the second color image signal; and
a noise removal unit performing a noise removal process by changing a noise removal strength with respect to the color difference signal in accordance with the color determined by the color determination section,
wherein the noise removal unit changes the noise removal strength by changing a synthesis ratio between the color difference signal and a signal obtained by removing a noise from the color difference signal in accordance with the color determined by the color determination section.

* * * * *